US011865845B2

(12) United States Patent
Chick et al.

(10) Patent No.: US 11,865,845 B2
(45) **Date of Patent: *Jan. 9, 2024**

(54) PRINT MATERIAL REFILL DEVICE

(71) Applicant: HEWLETT-PACKARD DEVELOPMENT COMPANY, L.P., Spring, TX (US)

(72) Inventors: Andrew P. Chick, Vancouver, WA (US); Kenneth K. Smith, Boise, ID (US); Matthew James Storey, Austin, TX (US); Pratik Shah, San Diego, CA (US); Luke Kim, Seongnam-si (KR); Sean Daniel Fitzgerald, Boise, ID (US); Mathew Lavigne, Boise, ID (US); Jeffrey H. Luke, Boise, ID (US); Jiwon Moon, Seongnam-si (KR); Minchul Lee, Seongnam-si (KR); Corbett Benjamin Schoenfelt, Austin, TX (US); Bennett Alexander Nadeau, Austin, TX (US); Zackary Thomas Hickman, Austin, TX (US); Jefferson Blake West, Austin, TX (US); Muriel Hale Shields, Austin, TX (US); An Tran, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/954,638

(22) Filed: Sep. 28, 2022

(65) Prior Publication Data

US 2023/0017982 A1 Jan. 19, 2023

Related U.S. Application Data

(63) Continuation of application No. 17/047,219, filed as application No. PCT/US2018/048769 on Aug. 30, 2018, now Pat. No. 11,491,797.

(51) Int. Cl.
*B41J 2/175* (2006.01)

(52) U.S. Cl.
CPC ....... *B41J 2/17513* (2013.01); *B41J 2/17523* (2013.01); *B41J 2/17596* (2013.01)

(58) Field of Classification Search
CPC ................ B41J 2/17506; B41J 2/17509; B41J 2/17513; B41J 2/17523; B41J 2/17596; G03G 15/08
See application file for complete search history.

(56) References Cited

U.S. PATENT DOCUMENTS 4,060,105 A 11/1977 Feldeisen et al.
4,304,273 A 12/1981 Caudill et al.
(Continued)

FOREIGN PATENT DOCUMENTS

CN 101163594 A 4/2008
CN 104049495 A 9/2014
(Continued)

*Primary Examiner* — Anh T Vo
(74) *Attorney, Agent, or Firm* — Foley & Lardner LLP

(57) ABSTRACT

An example print material replenishment device includes a container to contain print material, a dispensing end to engage a fill port of a printing device, the dispensing end including an opening that is offset from a center axis of the container, and a rotatable cover coupled to the dispensing end, the rotatable cover to expose the opening of the dispensing end based on a rotation of the print material replenishment device.

18 Claims, 10 Drawing Sheets

(56) References Cited

U.S. PATENT DOCUMENTS

| | | | | |
|---|---|---|---|---|
| 4,877,065 | A * | 10/1989 | Lamboy | B65B 3/16 141/319 |
| 5,646,664 | A | 7/1997 | Pawlowski, Jr. | |
| 6,158,851 | A | 12/2000 | Zepeda | |
| 6,259,877 | B1 | 7/2001 | Taniyama et al. | |
| 6,505,926 | B1 | 1/2003 | Trafton et al. | |
| 7,937,029 | B2 | 5/2011 | Murase et al. | |
| 8,050,597 | B2 | 11/2011 | Yoshizawa et al. | |
| 8,151,838 | B2 * | 4/2012 | Seaborne | B65D 1/06 141/356 |
| 8,590,742 | B2 | 11/2013 | Devos et al. | |
| 8,678,571 | B2 | 3/2014 | Wagner et al. | |
| 8,777,182 | B2 * | 7/2014 | Springer | A47G 19/2205 137/499 |
| 9,016,333 | B2 * | 4/2015 | Shaffer | B67D 1/1272 141/113 |
| 9,046,820 | B1 | 6/2015 | Yamada et al. | |
| 2004/0061749 | A1 | 4/2004 | Corby et al. | |
| 2008/0279593 | A1 | 11/2008 | Kitaoka | |
| 2011/0181672 | A1 | 7/2011 | Wagner et al. | |
| 2012/0219318 | A1 | 8/2012 | Yoshida et al. | |
| 2013/0182048 | A1 | 7/2013 | Nozawa et al. | |

FOREIGN PATENT DOCUMENTS

| | | | |
|---|---|---|---|
| CN | 204249557 | U | 4/2015 |
| EP | 0 689 104 | A1 | 12/1995 |
| EP | 0 722 837 | A1 | 7/1996 |
| EP | 0 808 717 | A2 | 11/1997 |
| EP | 1089136 | A2 | 4/2001 |
| EP | 1 209 537 | A2 | 5/2002 |
| EP | 2 261 751 | A2 | 12/2010 |
| EP | 2367068 | A2 | 9/2011 |
| KR | 10-1996-0701786 | A | 3/1996 |
| KR | 10-2000-0068484 | A | 11/2000 |
| WO | 98/55318 | A1 | 12/1998 |
| WO | WO-2010/044788 | A1 | 4/2010 |
| WO | 2011/155642 | A1 | 12/2011 |
| WO | WO-2012/145343 | A2 | 10/2012 |
| WO | 2015/112501 | A1 | 7/2015 |

* cited by examiner

PRINT MATERIAL REFILL DEVICE

BACKGROUND

Printing devices such as printers, copiers, large format plotters, 3D-printers, etc. deposit various materials onto a medium, substrate, or platform to form objects or markings human visible, or machine detectable, in various wavelengths across the light spectrum otherwise referred to as text, graphics, images, reproductions, shadings, highlights, constructs, objects, print jobs, etc. In some examples, printing devices may form markings on a physical medium by performing a process such as a print job. A print job can include forming markings such as text and/or images by, in part, transferring and/or depositing print material to the physical medium as part of an overall print process.

DETAILED DESCRIPTION

Figure 1:
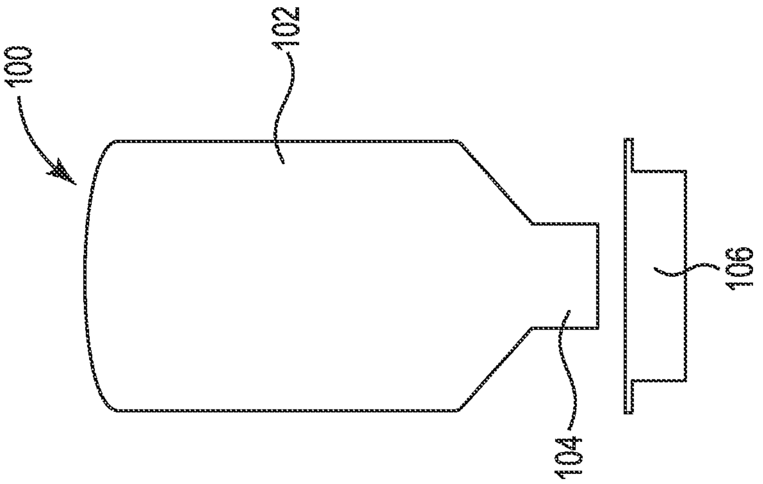
FIG. 1 illustrates an example of a print material container consistent with the disclosure.

Printing devices may include a supply of a print material located in a reservoir. As used herein, the term "print material" refers to a substance which, based on being applied to a medium, can form a representation(s) on the medium during a print job. In some examples, the print material can be deposited in successive layers to create a three-dimensional (3D) object. For example, print material can include print material particles, a toner material, a powdered semi-crystalline thermoplastic material, a powdered metal material, a powdered plastic material, a powdered composite material, a powdered ceramic material, a powdered glass material, a powdered resin material, and/or a powdered polymer material, among other types of powdered or particulate material. The print material can be particles with an average diameter of less than 100 microns. For example, the print material can be particles with an average diameter of between 0-100 microns. However, examples of the disclosure are not so limited. For example, print material can be particles with an average diameter of between 20-50 microns, 5-10 microns, or any other range between 0-100 microns. The print material can be fused when deposited to create a 3D object.

The print material can be deposited onto a physical medium. As used herein, the term "printing device" refers to any hardware device with functionalities to physically produce a representation(s) on the medium. In some examples, the printing device can be a 3D printer. For example, the 3D printer can create a representation (e.g., a 3D object) by depositing print material in successive layers to create the 3D object.

The reservoir including the print material may be inside of the printing device and include a supply of the print material such that the printing device may draw the print material from the reservoir as the printing device creates the images on the print medium. As used herein, the term "reservoir" refers to a container, a tank, and/or a similar vessel to store a supply of the print material for use by the printing device.

As the printing device draws the print material from the reservoir, the amount of print material in the reservoir may deplete. As a result, the amount of print material in the reservoir of the printing device may have to be replenished.

A print material refill device may be utilized to replenish the reservoir of the printing device with print material. For instance, the print material refill device can be a print material replenishment device. During an initial fill or replenishment operation, the print material refill device can transfer print material from the print material refill device to the reservoir of the printing device.

Some approaches to filling or replenishing a reservoir of a printing device include replacing a print material reservoir. In such approaches, a printing device is opened, a print material reservoir is removed from the printing device, and a new print material reservoir is installed. In some approaches, the printing device may have more than one print material reservoir, meaning a user is to know which print material reservoir to remove and replace.

In other approaches, the print material reservoir is removed, replenished outside of the printing device, and returned to the printing device. This can be a messy process that can result in spills and/or environment contamination. Over- or under-filling of a print material reservoir may also occur due to user error or inefficient fill methods.

Examples of the present disclosure include a print material refill device that allows for replenishment of a print material reservoir in-situ. For instance, the print material reservoir may include a fill port that can receive the print material refill device. The print material refill device can be used to fill and/or replenish the print material reservoir in-situ such that the print material reservoir remains within a printing device during filling/replenishing. For instance, some examples of the present disclosure allow for filling/replenishing of print material in a manner that may be more convenient, faster, and simpler for a user as compared to other approaches. For instance, a plurality of mechanisms can be used in the print material refill device to make a filling/replenishing process easier and cleaner.

In some instances, by filling/replenishing the print material reservoir in-situ using the print material refill device, printing and/or operating costs (e.g., costs-per-page) can be reduced because a print material refill device is sufficient for refilling a print material reservoir. Because the print material refill device may include limited or no gears, motors, electronics, etc., the cost to make and distribute the print material refill device may be reduced. This reduction can result in cost savings for a user.

FIG. 1 illustrates an example of a print material refill device 100 consistent with the disclosure. Print material refill device 100 can include a container 102 having a dispensing end 104. The container 102 can dispense print material directly to an in-situ reservoir of a printing device. The dispensing end 104 can be integrated with the container 102, in some examples, and can facilitate connection of the container 102 to a fill port 106 of the reservoir. The dispensing end 104, in some examples, can include an output opening, as will be described further herein, that is offset from a center axis of a tip of the container 102. The print material refill device 100 may include various components to selectively expose the dispensing end 104, such as in response to a rotation movement such that an opening in the dispensing end 104 may align with an opening in the reservoir. The dispensing end 104 can facilitate a plunger of the container 102 (not pictured in FIG. 1) to push the print material through the aligned openings into the reservoir. A coupling device (not illustrated in FIG. 1) can engage the fill port 106 during connection of the container 102 to the fill port 106.

The container 102 can include a plurality of mechanisms (e.g., dispense mechanisms), as will be discussed further herein, including a compression mechanism, a squeeze bottle mechanism, a print material bag mechanism, a bulb pump mechanism, and/or an accordion-shaped collapsible container, among others. In some instances, the container 102 can include a print material reservoir to store a supply of print material. The print material reservoir of the container 102 can supply/resupply a printing device (e.g., a host print system) with print material, as is further described herein.

In some examples, the print material refill device 100 can be prepared for dispensing print material by agitating the print material refill device 100 and inserting the print material refill device 100 into the fill port 106. Docking of the print material refill device 100 can include coupling the print material refill device 100 to the fill port 106, allowing the dispensing end 104 of the print material refill device 100 to open along with an opening in the reservoir of the printing device. This can allow transfer of print material to the reservoir of the printing device. Responsive to an indication that transfer is complete, the print material refill device 100 can be uncoupled and undocked, which closes openings in the dispensing end 104 of the print material refill device 100 and the reservoir of the printing device. The print material refill device 100 can be removed from the fill port 106, completing the print material transfer.

Figure 2:
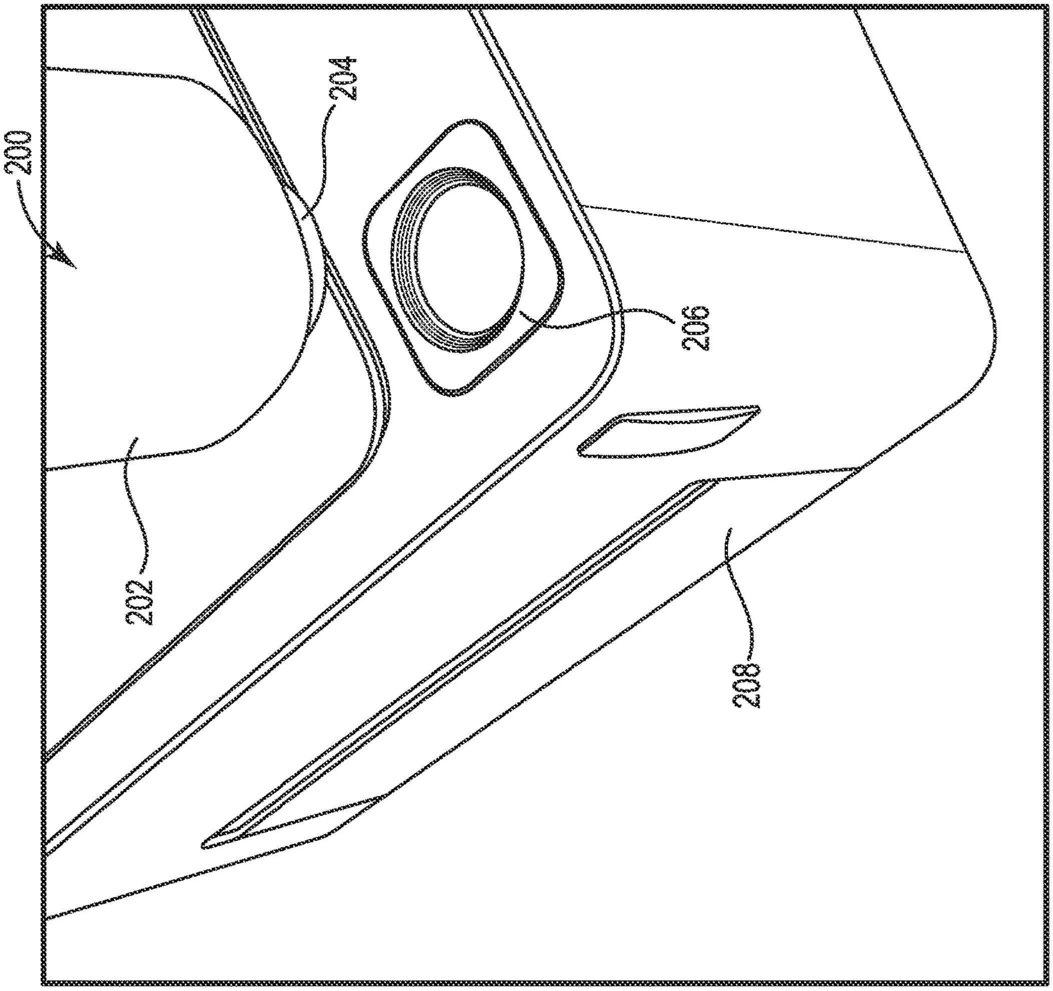
FIG. 2 illustrates an example of a print material container and a printing device consistent with the disclosure.

FIG. 2 illustrates an example of a print material refill device 200 and a printing device 208 consistent with the disclosure. Print material refill device 200 may include a container 202 and a dispensing end 204 that can be coupled to a fill port 206 of printing device 208. While one fill port 206 on top of printing device 208 is illustrated in FIG. 2, more than one fill port may be present on printing device 208 in some examples and/or a fill port may be located elsewhere on printing device 208. For instance, a fill port may be present on a side of printing device 208 or on a plurality of sides of printing device 208, a plurality of fill ports may be present on a side of printing device 208 or on a plurality of sides of printing device 208, and/or a plurality of fill ports may be present on top of printing device 208, among other options.

Printing device 208 can house a reservoir for receiving print material from print material refill device 200. The reservoir may remain in printing device 208 during filling/replenishing of the reservoir. Upon completion of the fill/refill, print material refill device 200 can be removed from printing device 208 (e.g., dispensing end 204 removed from fill port 206) and a print job can resume/commence.

Figure 3:
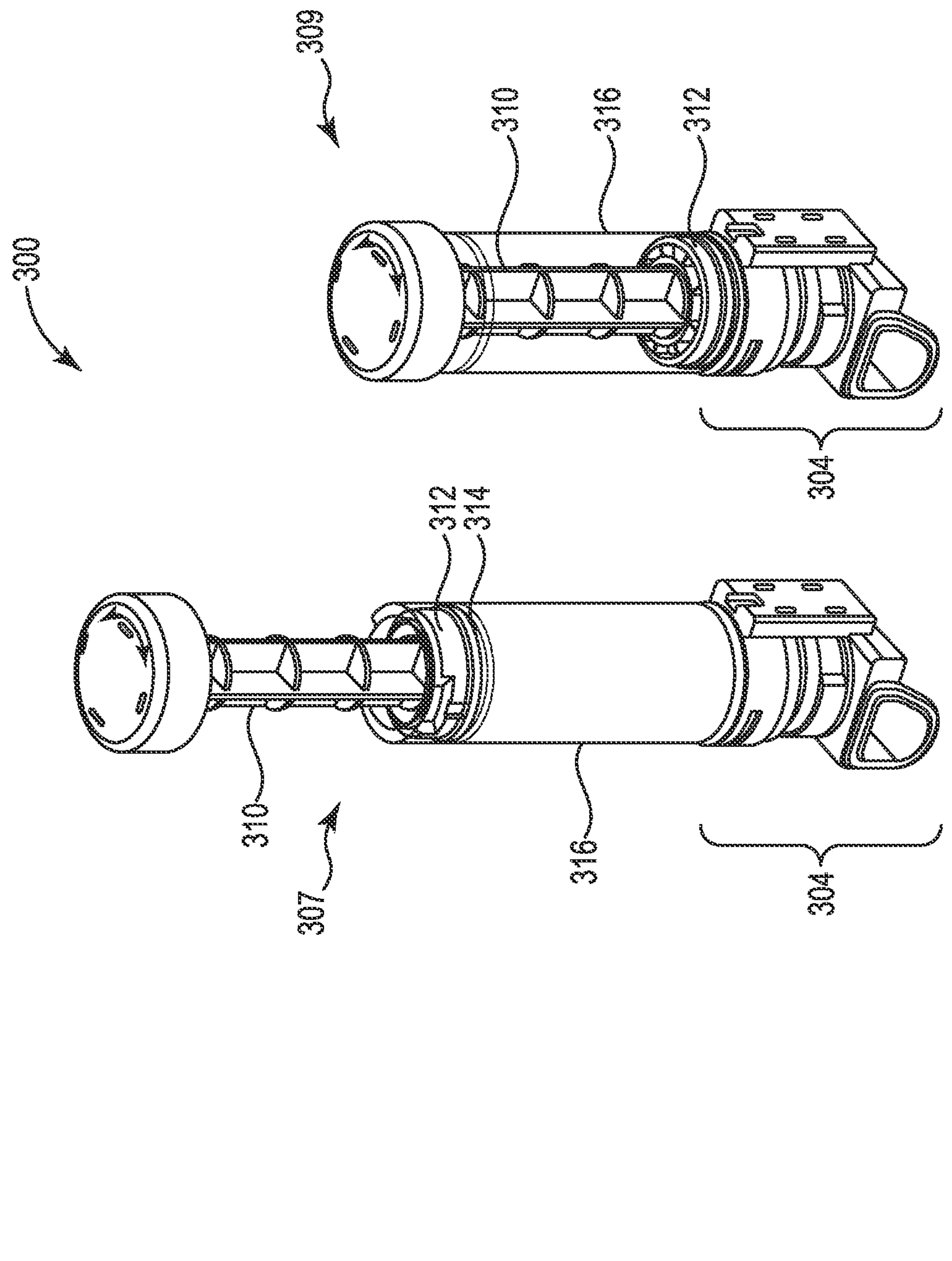
FIG. 3 illustrates an example of a print material container having a compression mechanism in a first position and a second position consistent with the disclosure.

FIG. 3 illustrates an example of a print material refill device 300 having a compression mechanism in a first position 307 and a second position 309 consistent with the disclosure. As used herein, the terms "compress" or "compression mechanism" refers to a reciprocating pump including a plunger and a tube, where the plunger can be linearly moved to allow the compress to take in and/or expel liquid, gas, or other material through an orifice at the end of the tube. A compress, in some examples, can include a syringe, and a compression mechanism in some examples can include a syringe mechanism. Print material refill device 300 can include an outer compress body 316 and a plunger 310. Outer compress body 316 can include an outer structure of the compression mechanism. For example, outer compress body 316 can be an outer structure of print material refill device 300 and can include plunger 310, a base 312, and/or an inner compress body discussed further herein.

As used herein, the term "plunger" refers to a piston to take in and/or expel liquid, gas, or other material through an orifice at the end of print material refill device 300. For example, print material refill device 300 can include an inner compress body (not illustrated in FIG. 3) that can be a print material reservoir (i.e., a container). For example, the print material reservoir of the print material refill device 300 can store a supply of print material. The print material reservoir of the print material refill device 300 can supply/resupply a printing device (e.g., a host print system). Plunger 310 can take in and/or expel the print material from the print material reservoir of the print material refill device 300, and plunger 310 can be a structure to adapt a volume of the print material reservoir of the print material refill device 300. For example, plunger 310 can increase or decrease a volume of the print material reservoir of the print material refill device 300 based on movement of plunger 310 in the print material reservoir of the print material refill device 300.

Plunger 310 can have a base 312, which can be a rubber material or other material for moving print material. Base 312, in some examples, can include a seal 314 coupled to plunger 310 via base 312 to protect plunger 310 from print material and sweep the print material within the compression mechanism. Seal 314 can be a felt material wipe seal or a synthetic material wipe seal, among other seals that prevent air from escaping around base 312. Seal 314 can allow for a more constant pressure on print material as compared to a plunger 310 and base 312 without a seal, in some instances. In some examples, plunger 310 and/or base 312 may be removed from the compression mechanism (e.g., for cleaning, replacement of components, etc.).

Print material refill device 300 can include a dispensing end 304, in some examples. The dispensing end 304 may include an opening through which material can be moved. For example, dispensing end 304 may include an opening through which print material can be moved in response to plunger 310 decreasing the volume of the print material reservoir of the print material refill device 300 based on movement of plunger 310 between first position 307 and second position 309.

While in first position 307, print material refill device 300 is not depressed. In such an example, a print material reservoir within print material refill device 300 can contain print material. While in second position 309, print material refill device 300 and the print material reservoir of the print material refill device 300 may be void of print material (e.g., having filled/refilled a printing device).

Although not illustrated in FIG. 3 for clarity and so as not to obscure examples of the disclosure, the print material refill device 300 can be coupled to (e.g., engaged with) a printing device via dispensing end 304 and a fill port of the printing device. For example, the print materials refill device 300 can be connected to a printing device so that print material may be supplied to the printing device so that the printing device can perform print jobs. Plunger 310 can be depressed to expel print material from print material refill device 300 to the printing device. For instance, plunger 310 can be depressed between first position 307 and second position 309. For example, print material refill device 300 can be connected to the printing device such that, during a fill and/or refill operation, plunger 310 can be moved between first position 307 and second position 309 to expel print material from the print material reservoir of the print material refill device 300 to the printing device. The print material can fill/refill the printing device such that the printing device can continue to perform print jobs.

In some examples, print material refill device 300 can be a toner material refill device, and can include a dispense mechanism (e.g., a compression mechanism) to dispense toner material to an in-situ reservoir of a printing device. In such an example, the dispense mechanism can include a compress storing the toner material and having plunger 310 to dispense the toner material responsive to a force applied at an end of the plunger. For instance, a force can be applied at the end of the plunger which creates pressure to drive air and toner material out of the compression mechanism. The dispensing end 304 of the print material refill device 300, as will be discussed further herein with respect to FIGS. 4-7, may engage a fill port of the reservoir of the printing device. In some instances, dispensing end 304 can be rotatably integrated with the print material refill device 300 or may include a rotatable component, such as a cover. In various examples, dispensing end 304 can open responsive to rotation of dispensing end 304 with respect to the print material refill device 300 or may include a rotatable cover to expose an opening of the dispensing end 304 responsive to rotation of the cover. While a toner material container is described in this example, other material containers may be used.

Figure 4:
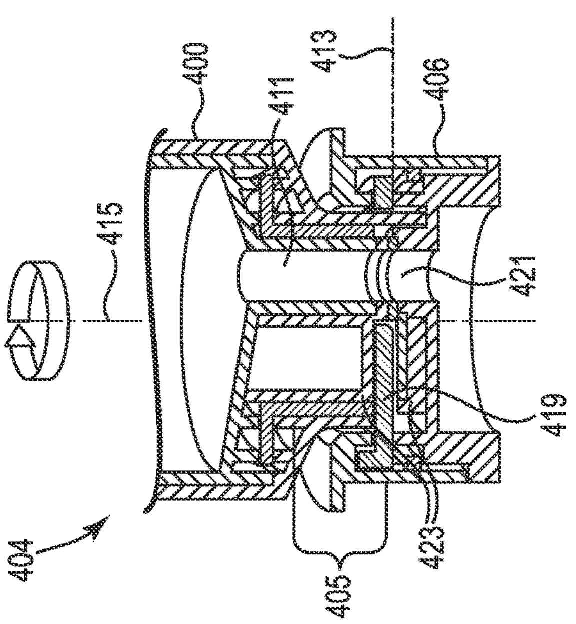
FIG. 4 illustrates an example of a valve locked to a replenishment port of a reservoir of a printing device consistent with the disclosure.

FIG. 4 illustrates an example of a dispensing end 404 engaged with a fill port 406 of a reservoir of a printing device consistent with the disclosure. Dispensing end 404, in some examples, may include a tip 405 at a distal end of the print material refill device 400. In various examples, the print material refill device 400 may include a dispense mechanism, such as a compress. The dispensing end 404 may engage with fill port 406 of a print material reservoir, such as by a tongue and groove assembly of the dispensing end 404 and the fill port 406. In various examples, dispensing end 404 may be rotatable (e.g., about axis 415) with respect to fill port 406 or may include a rotatable component, such as a cover.

In an example, dispensing end 404 can prevent exposure of a print material column 411 or a fill port entrance 421 to a user. For instance, during docking and undocking of the print material refill device 400, engaging and rotation of the dispensing end 404 with the fill port 406 may cause a cover 419 of fill port 406 to expose the fill port entrance 421. Similarly, engaging and rotation of the dispensing end 404 with the fill port 406 may cause rotation of a cover of the print material refill device 400 to rotate and expose the print material column 411. In either case, this can result in print material column 411 and entrance 421 to fill port 406 being in direct contact with each other. This can prevent residual print material from falling out of the print material refill device 400 during removal by allowing fill port 406 to cleanly shear (e.g., at shear plane 413) print material column 411 between wipe seals 423. For example, wipe seal 423 of the print material refill device 400 may operate as a rotatable cover of the print material column 411.

In some examples, dispensing end 404 can include an output opening, for instance at an end of print material column 411, that is offset from a center axis (e.g., axis 415) of print material refill device 400. Dispensing end 404 can open responsive to rotation with respect to the fill port 406 such that opposite openings of the print material refill device 400 and fill port 406 align. In that case, the dispensing end 404 can facilitate a plunger to push toner material through aligned openings into the reservoir of the printing device.

In the example illustrated in FIG. 4, print material refill device 400 is engaged to fill port 406 by dispensing end 404, such that print material may pass through print material column 411. While not illustrated here, prior to docking of print material refill device 400, dispensing end 404 may not be engaged with fill port 406, meaning print material column 411 would be closed off and print material would be unable to pass.

Figure 5:
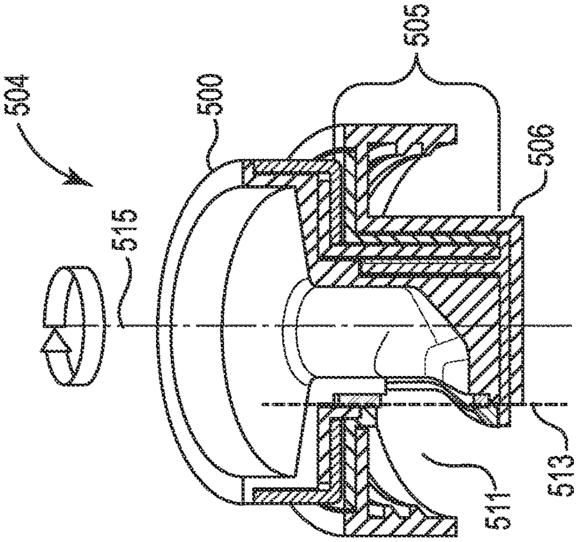
FIG. 5 illustrates another example of a valve locked to a replenishment port of a reservoir of a printing device consistent with the disclosure.

FIG. 5 illustrates another example of a dispensing end 504 engaged with a fill port 506 of a reservoir of a printing device consistent with the disclosure. Dispensing end 504, in some examples, may include a tip 505 at a distal end of print material refill device 500. The dispensing end 504 may engage with fill port 506 of a print material reservoir. In various examples, dispensing end 504 may be rotatable (e.g., about axis 515) with respect to fill port 506.

Dispensing end 504 can prevent exposure of a print material column 511 of a fill port 506 entrance to a user. For instance, during docking and undocking, tip 505 swaps places with a cover of fill port 506. This can result in tip 505 and an entrance to fill port 506 in direct contact with each other. This can prevent residual print material from falling out of the print material refill device 500 during removal by allowing fill port 506 to cleanly shear (e.g., at shear plane 513) print material column 511 between seal wipes.

In the example illustrated in FIG. 5, print material refill device 500 is engaged with fill port 506, such that print material may pass through print material column 511. While not illustrated here, prior to rotation of dispensing end 504, dispensing end 504 may not be engaged with fill port 506, meaning print material column 511 would be closed off and print material would be unable to pass.

Figure 6:
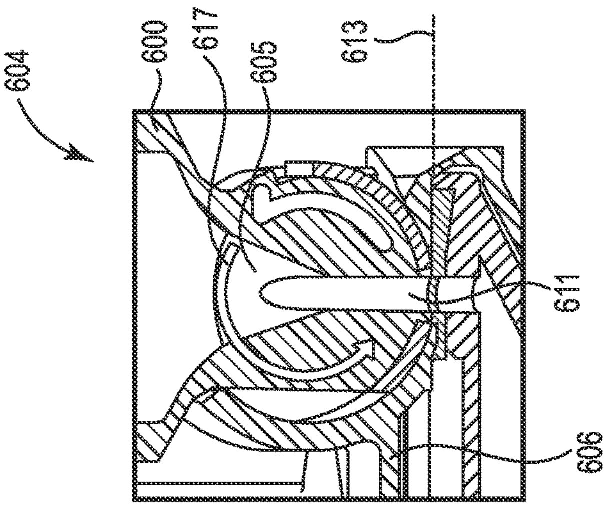
FIG. 6 illustrates yet another example of a valve locked to a replenishment port of a reservoir of a printing device consistent with the disclosure.

FIG. 6 illustrates yet another example of a dispensing end 604 engaged with a fill port 606 of a reservoir of a printing device consistent with the disclosure. Dispensing end 604, in some examples, may include a tip 605 at a distal end of a print material refill device 600. The dispensing end 604 may engage with a fill port 606 of a print material reservoir. Dispensing end 604 may be rotatable with respect to fill port 606.

Dispensing end 604 can prevent exposure of a print material column 611 or fill port 606 entrance to a user. For instance, during docking and undocking, tip 605 swaps places with a cover of fill port 606. This can result in tip 605 and an entrance to fill port 606 in direct contact with each other. This can prevent residual print material from falling out of the print material refill device 600 during removal by allowing fill port 606 to cleanly shear (e.g., at shear plane 613) a print material column 611 between seal wipes.

In the example illustrated in FIG. 6, print material refill device 600 is engaged with fill port 606, such that print material may pass through print material column 611. While not illustrated here, prior to rotation of dispensing end 604, dispensing end 604 may unlock from fill port 606, meaning print material column 611 would be closed off and print material would be unable to pass.

Figure 7:
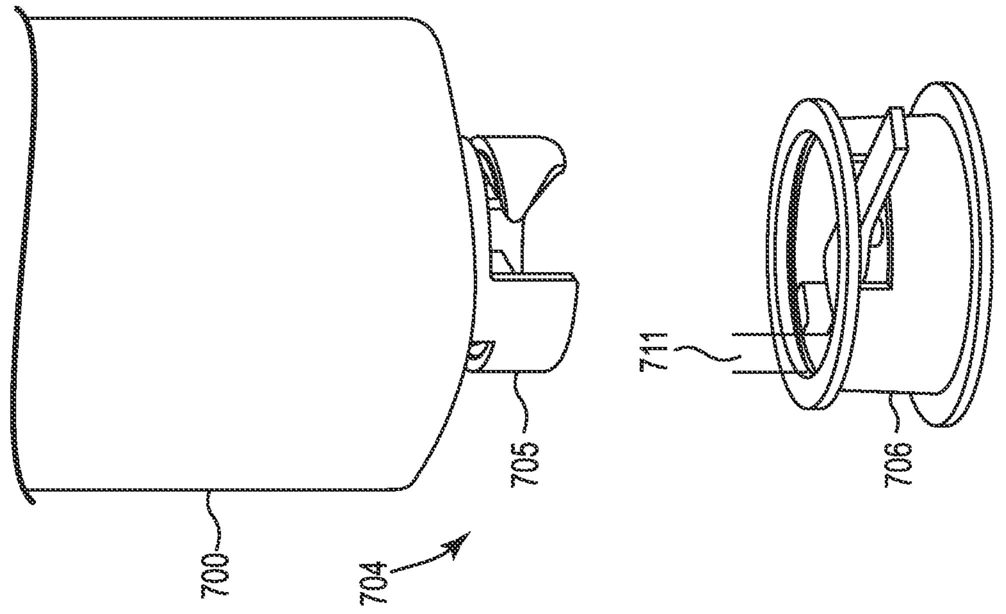
FIG. 7 illustrates another example of a valve locked to a replenishment port of a reservoir of a printing device consistent with the disclosure.

FIG. 7 illustrates another example of a dispensing end 704 to engage a fill port 706 of a reservoir of a printing device consistent with the disclosure. Dispensing end 704, in some examples, may include a tip 705 at a distal end of a print material refill device 700. The tip 705 can include a lock feature to engage with and lock to fill port 706 of a print material reservoir. In the example of FIG. 7, the lock feature may include a slot in tip 705 that is, upon rotation of dispensing end 704, to capture an arm or protrusion of fill port 706. Dispensing end 704 may be rotatable with respect to fill port 706.

Dispensing end 704 can prevent exposure of a print material column 711 or a fill port 706 entrance to a user. For instance, during docking and undocking, tip 705 swaps places with a cover of fill port 706. This can result in tip 705 and an entrance to fill port 706 in direct contact with each other. An axis of dispensing end 704, print material column 711, and compress 700 can be in line such that tip 705 uncovers fill port 706 while docking, creating a seal and allowing print material to pass through print material column 711.

In the example illustrated in FIG. 7, print material refill device 700 is not engaged with fill port 706. While not illustrated here, print material refill device 700 can be docked and locked to fill port 706 to allow print material to pass through print material column 711. Prior to rotation of dispensing end 704, dispensing end 704 may not be engaged with fill port 706, meaning print material column 711 would be closed off and print material would be unable to pass.

Figure 8:
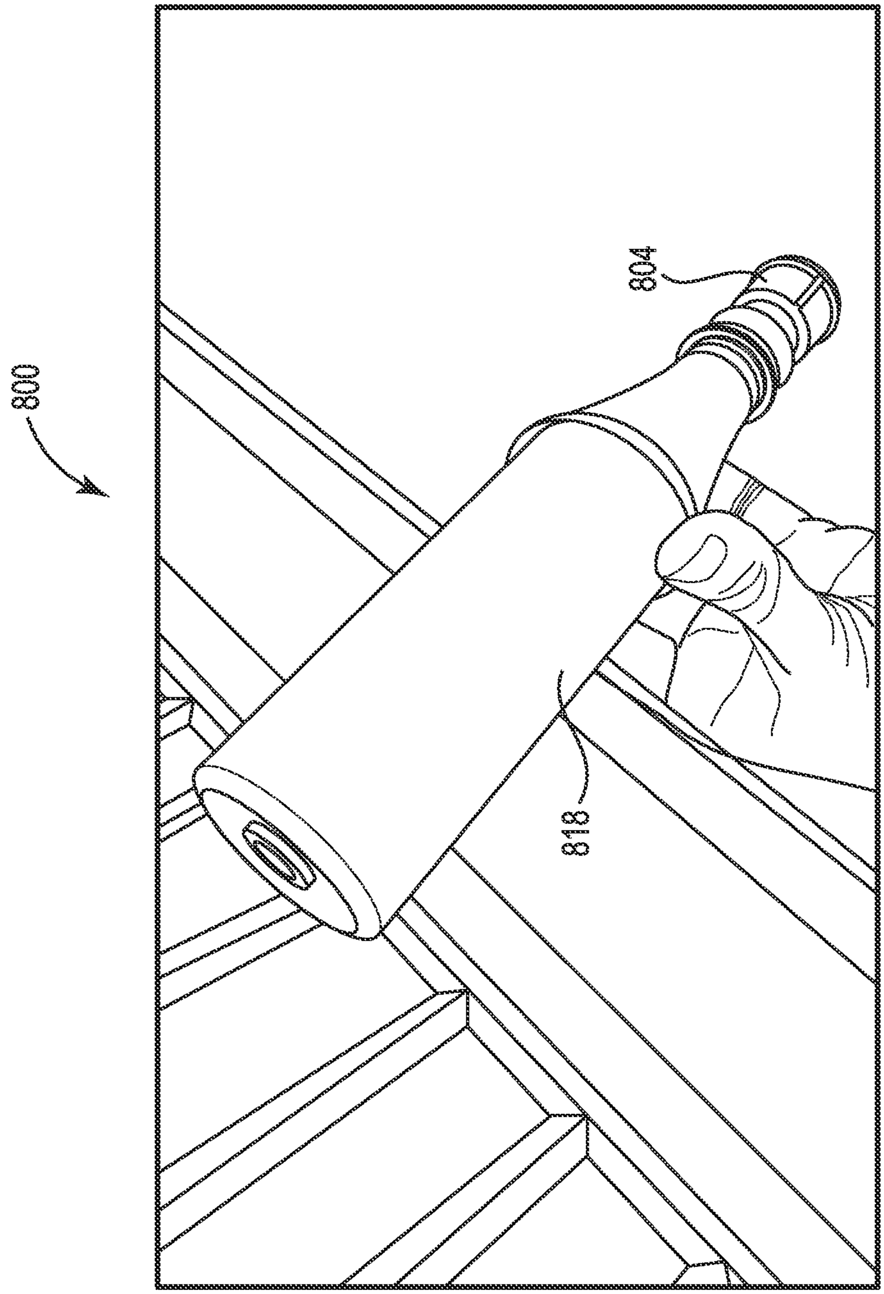
FIG. 8 illustrates an example of a print material container having a bag mechanism consistent with the disclosure.

FIG. 8 illustrates an example of a print material container 800 having a squeeze bottle mechanism 818 consistent with the disclosure. In some examples, squeeze bottle mechanism 818 can include valve 804 to facilitate transfer of print material to a reservoir of a printing device. For instance, squeeze bottle mechanism 818 can house print material that can be released through valve 804, which can be a one-way valve, to dispense the print material.

Squeeze bottle mechanism 818 can be squeezed a plurality of times using a pumping action to dispense the print material. This pumping action can aerate the print material during dispensing in some instances. The pumping action can be repeated until the desired amount of print material (e.g., all the print material) have been dispensed through valve 804 into the reservoir of the printing device. Valve 804 can be received by a fill port of the printing device to facilitate the transfer of print material, in some examples.

Figure 9:
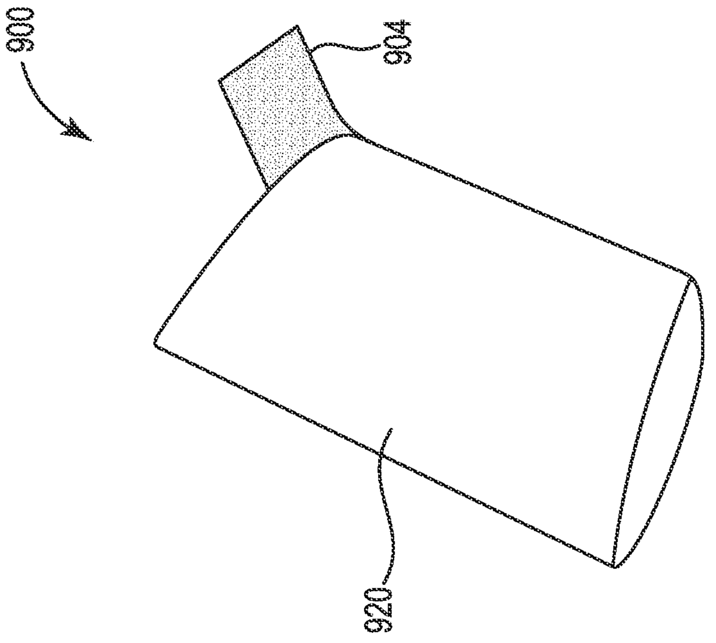
FIG. 9 illustrates an example of a print material container having a squeeze bottle mechanism consistent with the disclosure.

FIG. 9 illustrates an example of a print material container 900 having a bag mechanism 920 consistent with the disclosure. In some examples, bag mechanism 920 can include valve 904 to facilitate transfer of print material to a reservoir of a printing device. For instance, bag mechanism 920 can house print material that can be released through valve 904, which can be a one-way valve, to dispense the print material.

For example, bag mechanism 920 can be squeezed a plurality of times using a pumping action to dispense the print material. This pumping action can aerate the print material during dispensing in some instances. The pumping action can be repeated until the desired amount of print material (e.g., all the print material) have been dispensed through valve 904 into the reservoir of the printing device. Valve 904 can be received by a fill port of the printing device to facilitate the transfer of print material, in some examples. In some instances, compressed air can be used to dispense the print material alternatively or in addition to the pumping action.

Figure 10:
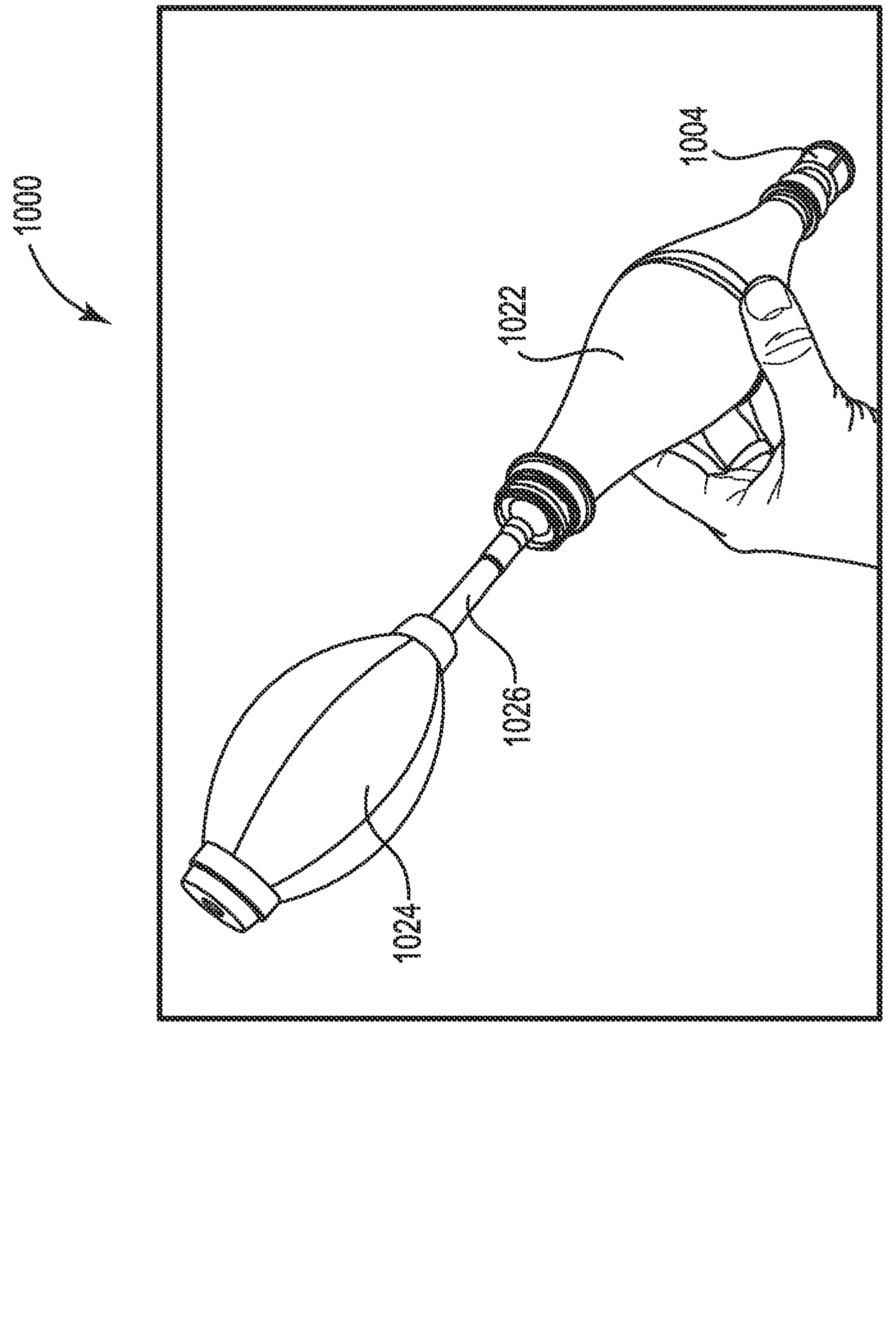
FIG. 10 illustrates an example of a print material container having a bulb pump mechanism consistent with the disclosure.

FIG. 10 illustrates an example of a print material container 1000 having a bulb pump mechanism consistent with the disclosure. For instance, the bulb pump mechanism can include a bulb pump 1024 coupled to a canister 1022 via tube 1026. In some examples, the bulb pump mechanism can include valve 1004 to facilitate transfer of print material to a reservoir of a printing device. For instance, canister 1022 can house print material that can be released through valve 1004, which can be a one-way valve, to dispense the print material.

Bulb pump 1024 can be squeezed a plurality of times using a pumping action to dispense the print material. This pumping action can aerate the print material during dispensing in some instances. The pumping action can be repeated until the desired amount of print material (e.g., all the print material) have been dispensed from canister 1022 through valve 1004 into the reservoir of the printing device. Valve 1004 can be received by a fill port of the printing device to facilitate the transfer of print material, in some examples.

Figure 11:
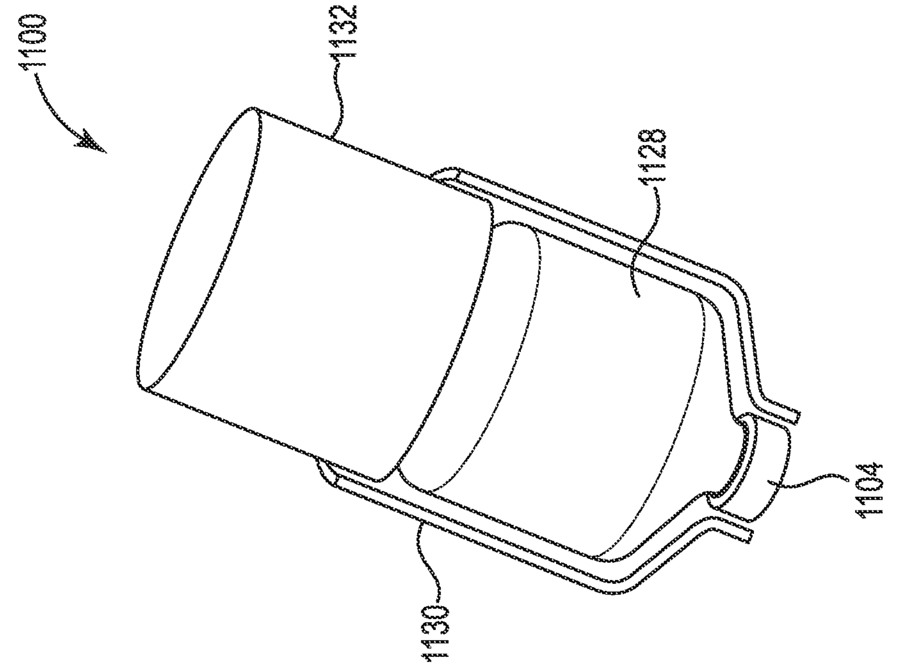
FIG. 11 illustrates an example of a print material container having a smooth container within a compression mechanism consistent with the disclosure.

FIG. 11 illustrates an example of a print material container 1100 having a smooth container 1128 within a compression mechanism 1130 consistent with the disclosure. Smooth container 1128 can be a bag or other container that can receive a force. Compression mechanism 1130 can house smooth container 1128 storing print material. In such an example, smooth container 1128 can be inside compression mechanism 1130 such that when a force is applied to plunger 1132, print material are dispensed via valve 1104 to a printing device reservoir as smooth container 1128 is compressed. Valve 1104 can be received by a fill port of the printing device to facilitate the transfer of print material, in some examples.

Smooth container 1128 can be removable from compression mechanism 1130, in some instances. For instance, smooth container 1128 can be a container that can be placed in compression mechanism 1130 for filling/replenishing of a printing device reservoir. Smooth container 1128 can be removed from compression mechanism 1130 upon completion of filling/replenishing of the printing device reservoir.

Figure 12:
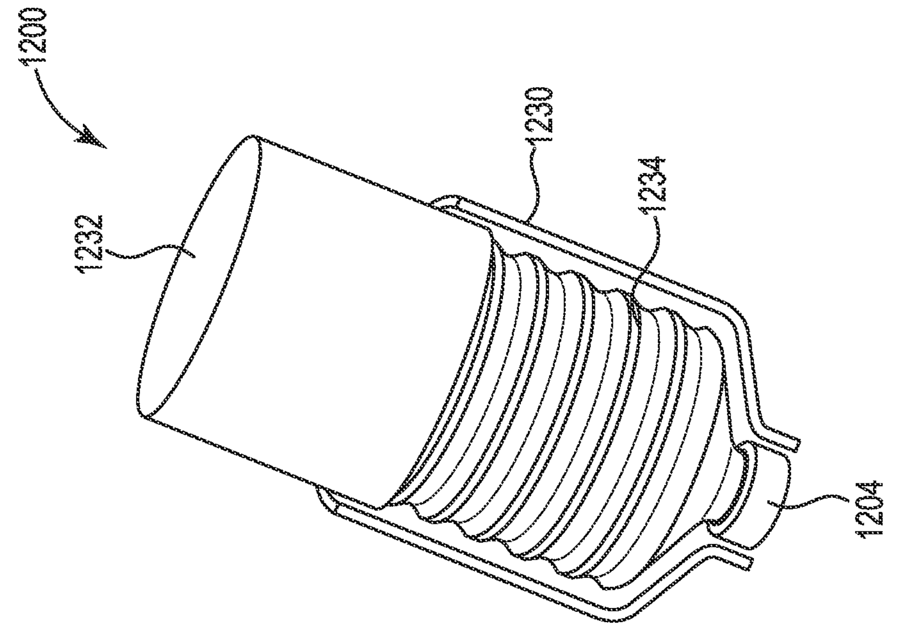
FIG. 12 illustrates an example of a print material container having an accordion-shaped collapsible container consistent with the disclosure.

FIG. 12 illustrates an example of a print material container 1200 having an accordion-shaped collapsible container 1234 within a mechanism 1230 consistent with the disclosure. Accordion-shaped collapsible container 1234 can be a bag or other container that can receive a force. Mechanism 1230 can house accordion-shaped collapsible container 1234 storing print material. In such an example, accordion-shaped collapsible container 1234 can be inside mechanism 1230 such that when a force is applied to plunger 1232, print material are dispensed via valve 1204 to a printing device reservoir as accordion-shaped collapsible container 1234 is compressed. Valve 1204 can be received by a fill port of the printing device to facilitate the transfer of print material, in some examples.

Accordion-shaped collapsible container 1234 can be removable from mechanism 1230, in some instances. For instance, accordion-shaped collapsible container 1234 can be a container that can be placed in mechanism 1230 for filling/replenishing of a printing device reservoir. Accordion-shaped collapsible container 1234 can be removed from mechanism 1230 upon completion of filling/replenishing of the printing device reservoir. In some instances, accordion-shaped collapsible container 1234 can collapse on itself and remain collapsed upon completion of filling/replenishing of the printing device reservoir. Accordion-shaped collapsible container 1234, in some examples, can have a valve as described in FIGS. 4-7 for connection to and filling/replenishing of the printing device reservoir.

Figure 13:
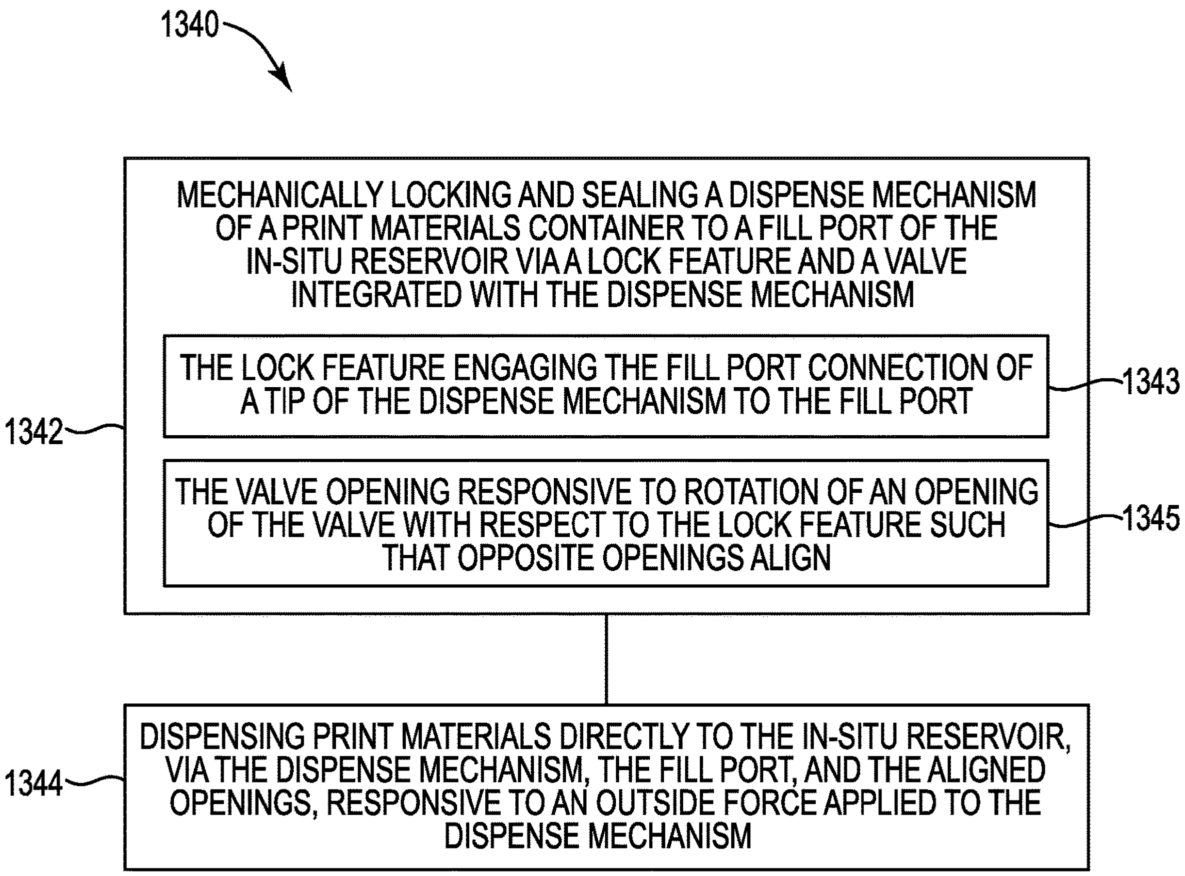
FIG. 13 illustrates a diagram of an example method for consistent with the disclosure.

FIG. 13 illustrates a diagram of an example method 1340 for refilling an in-situ reservoir of a printing device consistent with the disclosure. At 1342, method 1340 includes mechanically locking and sealing a dispense mechanism of a print material container to a fill port of the in-situ reservoir via a lock feature and a valve integrated with the dispense mechanism. For instance, a dispense mechanism such as a compression mechanism, squeeze bottle mechanism, print material particle bag mechanism, or bulb pump mechanism, among others, can house print material particles for supplying the reservoir. The reservoir can be in-situ such that it remains within a printing device during filling/replenishing.

In some examples, the dispense mechanism can be mechanically locked to the fill port responsive to a turn of the dispense mechanism. The turn can include sufficient rotation to enable connection of the fill port. For instance, the dispense mechanism can be coupled, or “locked” to a fill port by connecting the dispense mechanism to the fill port and turning and/or twisting the dispense mechanism. In some examples, the dispense mechanism may be turned and/or twisted a particular amount, for instance, 15 degrees, 30 degrees, 45 degrees, 90 degrees, or 180 degrees, among others. Other degree amounts or directions may be used, for instance a range of degrees or different coupling approaches. The interlocking connection can include the opening of valve doors on the dispense mechanism and/or the fill port to allow for transfer of print material while avoiding spillage or spraying of print material. Other interlocking connections and/or other coupling techniques may be used to couple the dispense mechanism to the fill port, for instance as described with respect to FIGS. 4-7.

Locking and sealing of the dispense mechanism can include the lock feature engaging the fill port during connection of a tip of the dispense mechanism to the fill port at 1343 and the valve opening responsive to rotation of an opening of the valve with respect to the lock feature such that opposite openings align at 1345. For instance, an opening created by the aligned openings can appear such that dispensing of print material occurs when the dispense mechanism is locked to the fill port, but not when unlocked.

At 1344, method 1340 includes dispensing print material directly to the in-situ reservoir, via the dispense mechanism, the fill port, and the aligned openings, responsive to an outside force applied to the dispense mechanism. For example, a plunger of the dispense mechanism can release a seal, which in turn can seal the print material and dispense the print material in response.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, “a” can refer to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 202 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being “on,” “connected to”, “coupled to”, or “coupled with” another element, it can be directly on, connected, or coupled with the other element or intervening elements may be present. In contrast, when an object is “directly coupled to” or “directly coupled with” another element it is understood that are no intervening elements (adhesives, screws, other elements) etc.

The above specification, examples, and data provide a description of the method and applications and the use of the system and method of the disclosure. Since many examples can be made without departing from the spirit and scope of the system and method of the disclosure, this specification merely sets forth some of the many possible example configurations and implementations.

What is claimed is:

1. A print material refill device, the device comprising:
a container to contain print material;
a dispensing end to engage a fill port of a printing device during connection of the print material refill device to the fill port, the dispensing end including a column offset from a center axis of the print material refill device to pass print material to an entrance of the fill port; and
a cover integrated with the dispensing end,
wherein the cover is to rotate to expose an opening of the column to the entrance of the fill port based on the connection of the print material refill device to the fill port.

2. The device of claim 1, wherein the container comprises a compression mechanism.

3. The device of claim 1, wherein the container comprises a squeeze bottle mechanism comprising a one-way valve to dispense the print material.

4. The device of claim 1, wherein the container comprises a print materials bag mechanism comprising a one-way valve to dispense the print material.

5. The device of claim 1, wherein the container comprises a bulb pump coupled to a canister storing print material to dispense the print material.

6. The device of claim 1, wherein the container comprises an accordion-shaped collapsible container storing print material.

7. The device of claim 1, wherein the dispensing end facilitates a plunger of the container to push the print material through the opening of the column to the entrance of the fill port.

8. A print material refill device, the device comprising:
a compress to store print material, the compress having a plunger to dispense the print material responsive to a force applied at an end of the plunger;

a dispensing end to engage a fill port of a printing device; and a seal coupled to the plunger to protect the plunger from the print material and sweep the print material within the compress, wherein the dispensing end is to open responsive to rotation of the dispensing end with respect to the fill port.

9. The device of claim 8, wherein the dispensing end includes an output opening that is offset from a center axis of the print material refill device, wherein the dispensing end is to expose an opening of the fill port responsive to the rotation of the dispensing end with respect to the fill port such that the output opening of the dispensing end and the opening of the fill port align, and wherein the open dispensing end facilitates the plunger to push the print material through the aligned openings into a reservoir of the printing device.

10. The device of claim 8, wherein the seal comprises a felt material wipe seal.

11. The device of claim 8, wherein the plunger is removable from the compress.

12. The device of claim 8, wherein the seal comprises a synthetic material wipe seal.

13. A print material replenishment device, the device comprising:

a container to contain print material;

a plunger movably coupled within the container;

a seal coupled to the plunger to protect the plunger from the print material and sweep the print material within the container;

a dispensing end to engage a fill port of a printing device, the dispensing end including an opening that is offset from a center axis of the container; and a rotatable cover coupled to the dispensing end, the rotatable cover to expose the opening of the dispensing end based on a rotation of the print material replenishment device.

14. The device of claim 13, wherein the plunger comprises:

a base, wherein the seal is coupled to the plunger via the base.

15. The device of claim 13, wherein the container includes at least one of a compression mechanism, a squeeze bottle mechanism, a print material bag mechanism, a bulb pump mechanism, or an accordion-shaped collapsible container.

16. The device of claim 13, wherein the dispensing end includes a tongue assembly to engage a groove assembly of the fill port.

17. The device of claim 13, wherein the print material comprises a toner material.

18. The device of claim 13, further comprising a wipe seal coupled to the dispensing end.

* * * * *